United States Patent [19]

Moses

[11] 4,119,021
[45] Oct. 10, 1978

[54] GAS STOVE ATTACHMENT

[75] Inventor: Lucius Moses, Detroit, Mich.

[73] Assignee: Viola M. Heyward, Sumpter, S.C.

[21] Appl. No.: 790,435

[22] Filed: Apr. 25, 1977

[51] Int. Cl.² ............................................. A47J 37/10
[52] U.S. Cl. ....................................... 99/425; 126/24;
126/215
[58] Field of Search ................. 99/425, 423, 422, 424;
126/24, 40, 39 H, 215, 216, 218, 211, 221, 217;
219/443

[56] References Cited

U.S. PATENT DOCUMENTS

| 1,922,420 | 8/1933 | Coulston | 126/215 |
| 2,011,125 | 8/1935 | Small | 99/425 |
| 2,211,545 | 8/1940 | Osborne | 99/425 |
| 2,351,130 | 6/1944 | Jones | 99/425 |
| 2,786,929 | 3/1957 | Michaelis | 219/445 |
| 3,416,513 | 12/1968 | Fischer et al. | 126/215 |

FOREIGN PATENT DOCUMENTS 55,342  6/1935  Norway ..................................... 126/24

Primary Examiner—George F. Mautz
Attorney, Agent, or Firm—Barnes, Kisselle, Raisch & Choate

[57] ABSTRACT

For use with a gas stove having an upper deck provided with at least one opening surrounding a gas burner, a frying attachment comprising a substantially flat tray having raised peripheral edges, legs at each tray corner for supporting the tray above the stove deck to provide an open region between the tray and the deck, and first and second pairs of opposed hooks carried by opposite edges of the tray and extending beneath the tray through the open region to engage a peripheral edge of the burner opening to hold the tray firmly in place.

10 Claims, 5 Drawing Figures

U.S. Patent    Oct. 10, 1978    4,119,021
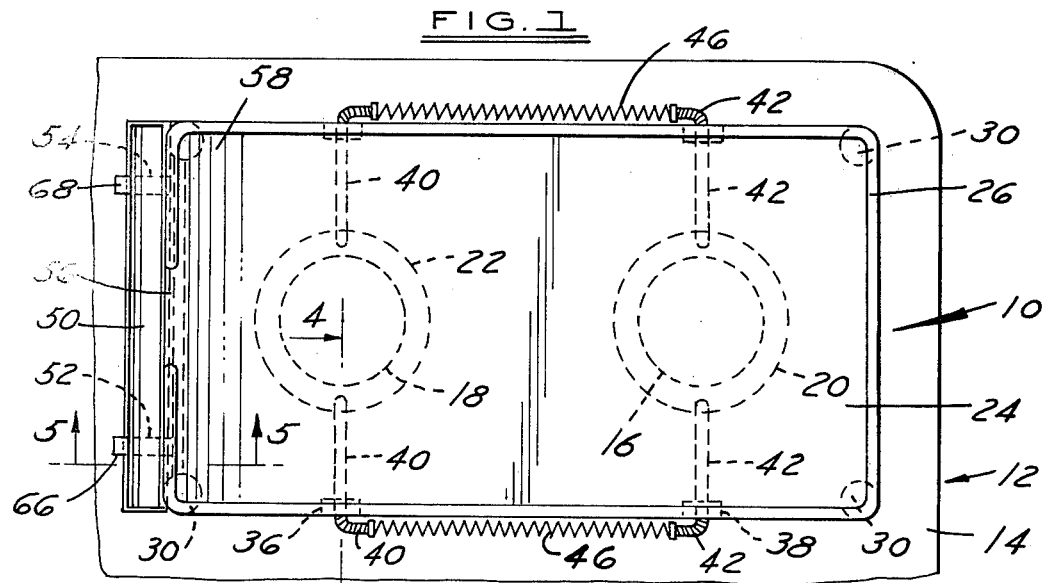
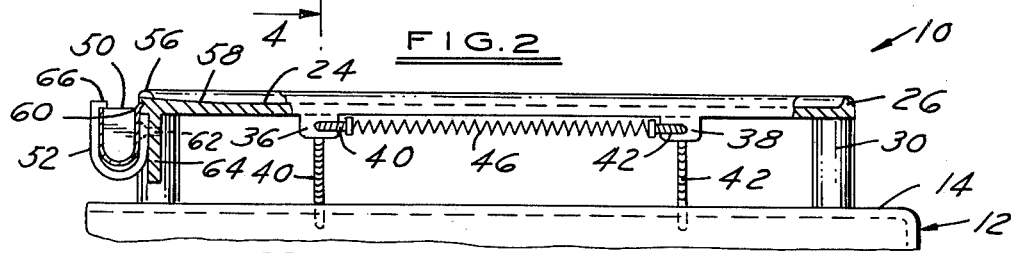
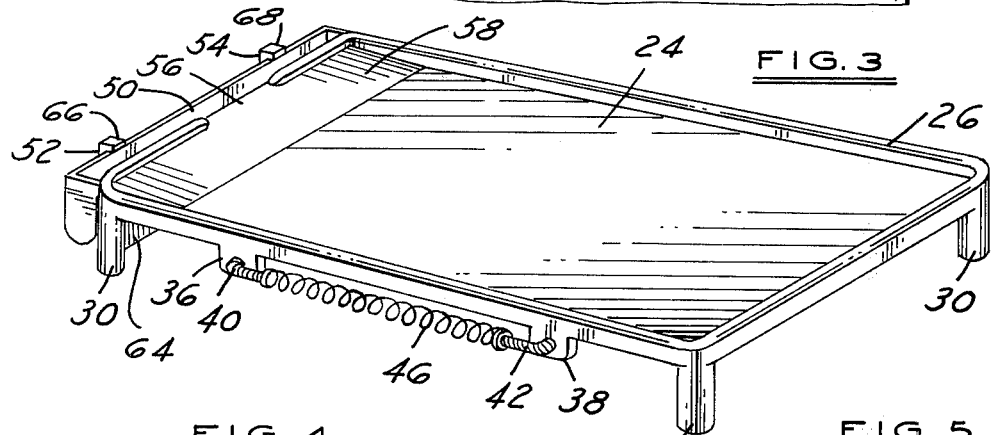
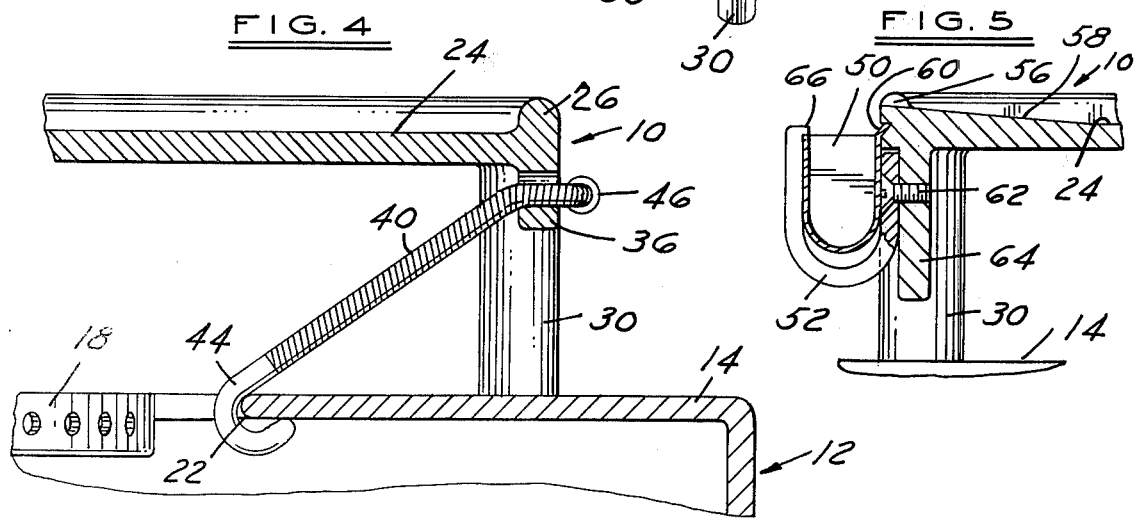

GAS STOVE ATTACHMENT

The present invention relates to stove attachments and, more particularly, to frying attachments for use with a conventional gas stove.

Objects of the present invention are to provide a frying attachment which may be used on a number of different types and sizes of conventional gas stoves without modifying the stoves themselves, which may be easily attached and removed, which is held firmly in place, and/or which has no projections to snag a cook's hands or clothes.

The invention, together with additional objects, features and advantages thereof, will be best understood from the following description when read in conjunction with the accompanying drawings in which:

FIG. 1 is a plan view of a presently preferred embodiment of the stove attachment provided by the invention;

FIG. 2 is a partially sectioned elevational view of the embodiment of FIG. 1;

FIG. 3 is a perspective view of the embodiment of FIG. 1;

FIG. 4 is a broken sectional view taken along the line 4—4 in FIG. 1; and

FIG. 5 is a broken sectional view taken along the line 5—5 in FIG. 1.

Referring to the drawings, a presently preferred embodiment 10 of the attachment provided by the invention is specifically adapted to rest upon the upper deck 12 of a conventional gas stove 14 having gas burners 16,18 respectively surrounded by the usual burner openings 20,22. Attachment 10 comprises a generally flat rectangular tray 24 having a raised lip or rim 26 around the tray edges to prevent grease or food from falling onto stove deck 14. Tray 24 is supported by four corner legs 30 above stove deck 14 to provide an open region 32 between the tray and deck. A pair of centrally apertured tabs 36,38 extend downwardly from each longitudinal edge of tray 24 and are spaced from each other the approximate distance between burners 16,18 on a conventional gas stove, preferably about twelve inches. Opposed pairs of wires 40,42 extend through the holes in respective tabs 36,38 and terminate in hooks 44 (FIG. 4) which engage opposite peripheral edges of burner openings 22,20. A pair of coil springs 46 connect the outer ends of wires 40,42 on each tray side, such that the cooperative interengagement of wires 40,42 with each burner opening 22,20 serves to hold stove attachment 10 firmly in place on the stove deck. Tray 24, rim 26, trough 28, legs 30 and tabs 36,38 are preferably formed as a single piece of cast iron.

A trough 50 of sheet metal is slidably disposed between a pair of U-shaped brackets 52,54 and the rear edge of tray 24 to receive grease or debris scraped by a spatula or the like from the surface of tray 24 through an opening 56 in the tray rim. The rear surface portion 58 of tray 24 is angled slightly upwardly to prevent matter from sliding inadvertently through opening 56. Trough 50 is closed at both ends and, as best seen in FIG. 5, has an outwardly angulated lip 60 along one elongated trough edge which is slidably received into a corresponding slot in the rear wall of tray 24 to prevent grease from leaking between the tray and trough edge. Brackets 52,54 are fixed to tray 24 by screws 62 (FIG. 5) received in a flange 64 extending downwardly from the rear tray edge and have lips 66,68 at the tray-remote bracket ends to capture and hold the second elongated edge of trough 50. Flange 64 not only serves to mount brackets 52,54 but also functions as a shield to retard heating of the grease in trough 50 by burner 18.

The stove attachment hereinabove described possesses several significant advantages over devices of similar type previously proposed. For example, the attachment may be purchased as a separate unit and used on a wide variety of conventional gas stoves without having to rework or refurbish the stove in any way. No special holes or hooks are needed on the stove. Although the attachment has been shown in the drawings in connection with burners 16,18 aligned with tabs 38,36, it will be apparent that the flexibility of wires 40,42 and springs 46 will readily accommodate greater or lesser spacing between the burner openings. Yet another, perhaps more subtle advantage of the invention lies in the fact that the attachment hooks are disposed beneath the cooking tray, and there are no external projections or attachment means, particularly along the tray front, to catch or snag a cook's clothing.

Trough 50 is axially slidable between brackets 52,54 and tray 24 to facilitate insertion and removal thereof without having to detach attachment 10 from the stove top. The attachment itself may, of course, be installed or removed from a stove in seconds. The invention has been described as covering two gas burners which is preferred both because this arrangement provides firmer attachment to the stove deck and because a larger tray surface provides greater cooking flexibility. However, possible modification of the invention for use with one or three or more burners and burner openings is envisioned.

The invention claimed is:

1. For use with a gas stove having an upper deck provided with first and second openings each surrounding a single gas burner, an attachment comprising a substantially flat tray having peripheral edges, means for supporting said tray above the stove deck to provide an open region between said tray and deck, first and second opposed hook means operatively carried by opposite edges of said tray and extending beneath said tray through said open region for engaging a peripheral edge of said first burner opening, and third and fourth opposed hook means operatively carried by opposite edges of said tray and extending beneath said tray through said open region for engaging a peripheral edge of said second opening, said hook means when so engaged holding said tray fixedly in place above the stove deck.

2. The stove attachment set forth in claim 1 wherein said tray is rectangular.

3. The stove attachment set forth in claim 2 wherein said first and third hook means are operatively carried by a first long edge of said rectangular tray, and wherein said second and fourth hook means are operatively carried by a second long edge of said rectangular tray oppositely of said first and third hook means respectively.

4. The stove attachment set forth in claim 1 further comprising a trough detachably disposed along one edge of said tray to receive grease and debris scraped from said tray.

5. For use with a gas stove having an upper deck provided with at least one opening surrounding a gas burner, an attachment comprising a substantially flat rectangular tray having peripheral edges, means for supporting said tray above the stove deck to provide an open region between said tray and deck, first and second opposed hook means operatively carried by opposite edges of said tray and extending beneath said tray through said open region for engaging a peripheral edge of the burner opening, said first and second opposed hook means when so engaged holding said tray fixedly in place above the stove deck, and a trough detachably disposed along one edge of said tray to receive grease and debris scraped from said tray.

6. The stove attachment set forth in claim 5 wherein the stove deck is provided with first and second openings each surrounding a single gas burner, said first and second hook means being for engagement with a peripheral edge of the first opening, and wherein said attachment further comprises third and fourth opposed hook means operatively carried by opposite edges of said tray, each of said third and fourth hook means extending beneath said tray through said open region for engaging a peripheral edge of the second opening.

7. The stove attachment set forth in claim 5 further comprising bracket means disposed along one short edge of said tray, said trough being slidably inserted within said bracket means along said short edge of said tray.

8. The stove attachment set forth in claim 7 further comprising a slot disposed along said one short edge of said tray, and wherein said trough further includes a lip slidably projecting into said slot.

9. The stove attachment set forth in claim 7 further comprising means disposed beneath said tray to retard heating of said trough by a gas burner.

10. The stove attachment set forth in claim 7 further comprising an upwardly projecting lip around said peripheral edges of said tray and an opening in said lip adjacent said trough.

* * * * *